United States Patent [19]

Brown

[11] 4,135,655
[45] Jan. 23, 1979

[54] PANEL CARRIER AND HANDLING DEVICE

[76] Inventor: Averil L. Brown, P.O. Box 843, Corning, Calif. 96021

[21] Appl. No.: 805,787

[22] Filed: Jun. 13, 1977

[51] Int. Cl.² ............................................. B65D 71/00
[52] U.S. Cl. .................................. 224/45 M; 294/34; 211/41
[58] Field of Search ...................... 224/45 M, 45 P, 50; 294/15, 16, 19 R, 103 R, 34; 211/41; 248/448, 449, 451

[56] References Cited

U.S. PATENT DOCUMENTS

| 606,924 | 7/1898 | Hale | 248/451 |
|---|---|---|---|
| 2,093,658 | 9/1937 | Hildenbrand | 294/34 |
| 2,243,305 | 5/1941 | Adler | 294/34 |
| 2,262,918 | 11/1941 | Brown | 294/15 |
| 2,428,941 | 10/1947 | Packard | 224/45 P |
| 2,559,190 | 7/1951 | Hallstream | 294/34 |
| 2,984,443 | 5/1961 | Bergengren | 248/451 |
| 3,162,473 | 12/1964 | George | 294/15 |
| 3,524,670 | 8/1970 | Ilich | 294/16 |
| 4,013,202 | 3/1977 | Russo | 294/16 |

FOREIGN PATENT DOCUMENTS

| 122637 | 3/1946 | Denmark | 224/45 M |
|---|---|---|---|
| 1044487 | 9/1966 | United Kingdom | 248/449 |

Primary Examiner—Trygve M. Blix
Assistant Examiner—Kenneth W. Noland
Attorney, Agent, or Firm—Leslie M. Hansen; Jack M. Wiseman

[57] ABSTRACT

A carrier for handling sheet-like material in the nature of standard sized panels of wood, wall board and the like having a width of lesser dimension that its length by means of a bar-like member of telescopically arranged halves each having a lateral projection at its exposed opposite ends providing clamping jaws for engaging the side edges of sheet material to be carried thereby, the telescopically arranged halve being spring urged together for closing the clamping jaws relative to the sheet material, and handle device on the bar-like member for manually manipulating the same.

2 Claims, 4 Drawing Figures

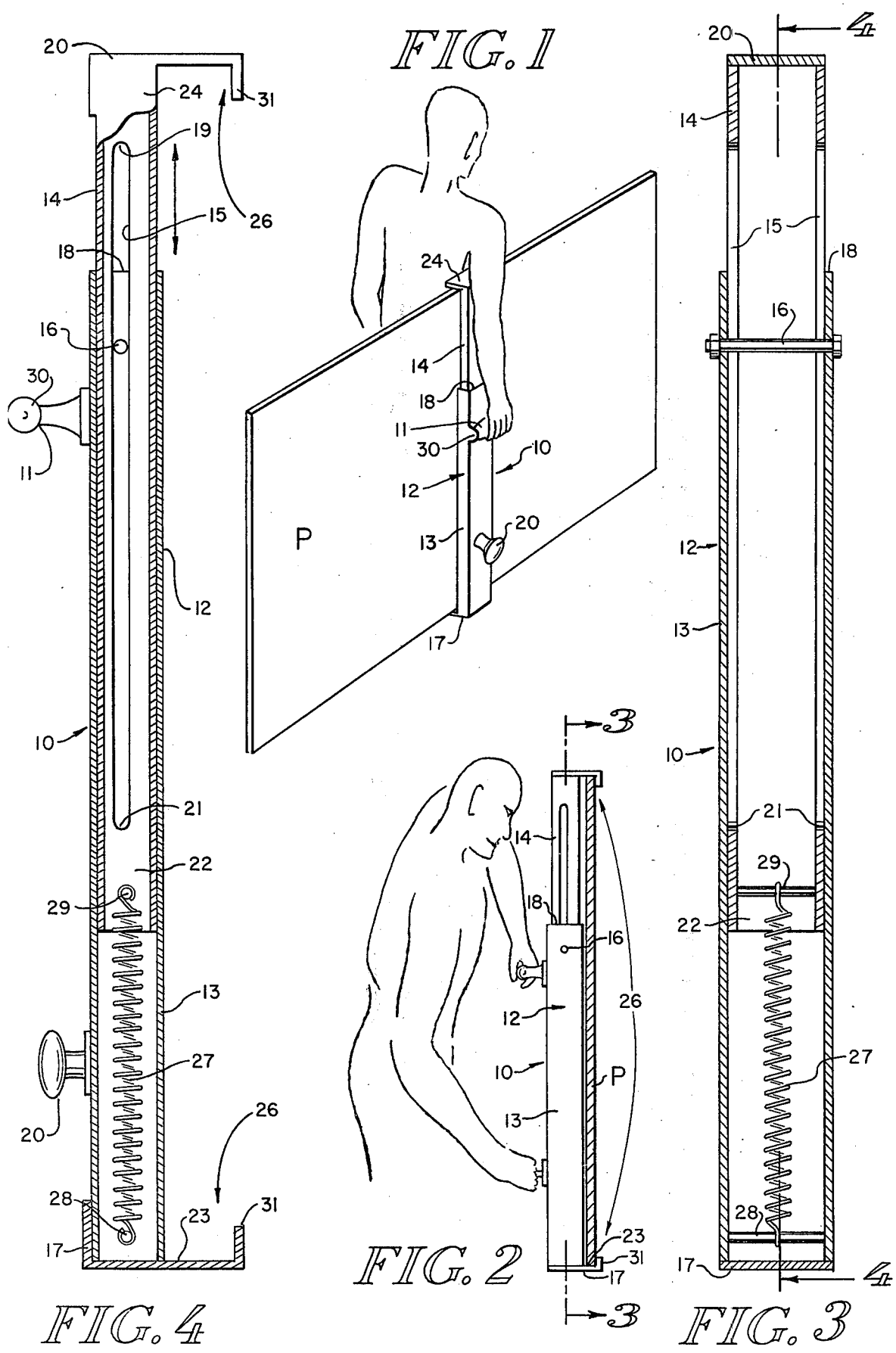

PANEL CARRIER AND HANDLING DEVICE

BACKGROUND

This invention relates to devices for carrying and handling sheet material such as wall board, wood panels, and the like.

In general, such panels are usually of stock size in modules of four feet in width and a length eight to ten feet.

Class 224, sub class 45 and 5 of the prior art reveals many types of devices by which panels of wood, sheets of glass and/or wall board may be carried by an individual with minimum effort and maximum safety. Among them are found a harness or strap type device to be worn by a person. See for example U.S. Pat. No. 2,399,786 which issued to Colon May 7, 1946; U.S. Pat. No. 2,431,780 to Theal, Dec. 2, 1947; and U.S. Pat. No. 2,651,441 to Rau et al dated Sept. 8, 1953. A simple carrying device found in U.S. Pat. No. 2,428,941 to PACKARD on Oct. 14, 1947, is operable by one man as in U.S. Pat. No. 3,524,670 granted to ILICH on Aug. 18, 1970. The ILICH patent is of Class 225 sub 16 relating to clamp type gripping of the sheet or panel to be carried by use of the device. This latter device is quite complex and is soley useful as a panel carrying means. The device of the present application while equally useful as a carrier, is further useful in the handling of such sheet material and placement thereof in a novel and advantageous manner as will become apparent in the following description.

STATEMENT OF THE INVENTION

The present invention has as its principle object the provision of a sheet gripping and handling device by which one man can conveniently and safely carry as well as hold the sheet during placement thereof on a wall and/or ceiling as the case may be.

It is another object to provide a sheet and/or panel carrying device in which both upper and lower edges of such article is firmly gripped such that the sheet can be lifted and carried by a single handle on the carrying device. In this connection, the carrying device is a bar in which upper and lower portions telescopically arranged have panel edge engaging projections on their respective ends for embracing the panel when the bar is disposed transverse to the narrow width of the panel.

It is another object of this invention to provide a carrying bar in which telescoping halves thereof are spring urged toward a closed condition enabling panel edge engaging projections on the respective ends of such bar halves to automatically embrace a panel therebetween.

It is yet another object of this invention to provide such a sheet embracing and carrying device with a pair of handles so disposed along its length as to enable the person using the device to raise the latter with panel embraced thereby into various planes and positions other than vertical.

These and other objects and advantages of the present invention will become apparent from a reading of the description and claims in the light of the accompanying single sheet of drawing in which:

FIG. 1 is a perspective view of the carrying device of the present invention in use.

FIG. 2 is an elevational view of the device of FIG. 1 as seen from the opposite side thereof and at slightly larger scale with respect thereto and as used in a different manner;

FIG. 3 is a longitudinal section through FIG. 2 taken along line 3-3 therein; and FIG. 4 is a vertical section through FIG. 3 taken along line 4-4 therein.

GENERAL DESCRIPTION

Referring to FIGS. 1 and 2 a panel designated P may be a wood panel such as plywood, finished wall board or sheet rock commonly used as an interior wall covering in place of plaster. The panel P may be an article such as a common door which come in various widths and it may be a pane of glass or a glazed window sash, whatever. As indicated in FIGS. 1 and 2, such panels are of a width beyond the reach of a human arm and in the absence of a carrying device must be handled by a person using both hands to grip upper and lower opposite edges across the narrow width of such panel.

As best illustrated in FIG. 1, the present invention has its embodiment in a bar like carrying device 10 which is disposed transverse of the narrow dimension of a panel and provided with a handle 11 along its length by which a person can manipulate the same by one hand only.

DETAILED DESCRIPTION

The carrying device 10 of the present invention comprises a bar-like member 12 consisting of two portions 13 and 14 telescopically united for changing the length thereof. The bar-like member 12 is preferably a pair of tubular members 13 and 14 preferably of square or rectangular cross sections in which one member 13 considered a base has the other member 14 slidably mounted therein. The inner member 14 has elongated slots 15 formed on opposite walls thereof through which a stop pin 16 extends from the outer or base member 13.

The base member 13 has a foot portion 17 at one end opposite an open end 18 thereof from which the other or inner member 14 extends. The stop pin 16 is disposed adjacent the open end 18 of the base member 13. The slot 15 formed in the inner member 14, through which the pin 16 extends, has a terminal end 19 adjacent a cap 20 on the exposed end of the inner member 14. The opposite end 21 of the slot 15 is disposed a sufficient distance from the confined opposite end 22 of the inner member 14 to afford stability of the latter when it extends fully out of the base member 13.

As best seen in FIG. 4 the foot portion 17 and the cap 20 each have a projection 23 and 24, respectively, extending parallel to each other to provide a pair of jaws 25 of a clamping means 26. This clamping means 26 includes a tension spring 27 disposed within the tubular member 13 and 14. The tension spring 27 has one end anchored as at 28 to the foot end of the base member 13 and its opposite end secured to a cross rod 29 carried by the inner member 14. The cross bar 29 extends transversally of opposite side walls of member 14 adjacent the confined end 22 thereof.

By the foregoing arrangement, the telescoping members 13 and 14 are normally drawn together such that the jaws 25 of the clamping means 26 are disposed to engage opposite edges —e— of a panel P to be carried by the device 10.

For purposes of the present disclosure, it is assumed that each of the tubular members 13 and 14 are of a length slightly greater than one half the width of a standard panel P.

A handle member 30 is secured to the base member 13 and disposed adjacent the open end 18 thereof. The handle 30 is well within arm reach of a person using the device 10 for carrying panels P. As seen in FIG. 1 the upper edge of the panel P is within a person's arm pit. The handle 30 is preferably a cross palm grip on side arms 31 secured to the member 13 so that the handgrip is spaced from the outer surface S of the base member 14 opposite that from which the clamping jaws 25 extend.

One or more sheets or panels are easily lifted and carried by use of the device 10 as constructed. To assure safe clamping of a panel P upon the carrier 10, the lateral projections 23 and/or 24 may have an inturned lip 31 as shown on the lower jaw 23 in FIG. 4.

By the foregoing arrangement a panel P is securely held between the jaws 25 and parallel to and flat against the bar-like member 12. The tension on the spring 27 assures a firm uniting of the carrier to the panel s such that they move in unison.

The carrier of the present invention is further enhanced by the provision of a knob 35 extending from the surface S of the base member 13 in spaced relation to the handle 30. The knob 35 is preferably disposed in the lower zone of the base member 13 to provide a hand grip for a person using the carrier 10. As best seen in FIG. 2 by using both hands a person gripping the handle 30 and knob 35 can lift the panel to a horizontal position for overhead support near a ceiling or to a position wherein the panel may be placed on end vertically for attachment to a wall.

From the foregoing it will be appreciated that the panel carrier embodying the present invention can be easily manipulated to support panel members and to enable a person to move the panels about easily with a minimum of effort and less fatigue.

Having thus described my new panel carrier in specific detail, it will be appreciated by those skilled in the art that it may be susceptible to alterations, modifications or variations without departing from the spirit or scope of my invention therein as called for in the appended claims.

What I claim as new and desire to protect by Letters Patent is:

1. A carrier for sheet material such as a wall board, wood panels, and the like comprising:
    (1) a bar-like member having a base member and a movable member telescopically arranged therein for longitudinal movement with respect to each other;
    (2) a foot portion on one end of said base member;
    (3) a cap member on said movable member having a lateral projection thereon for limiting movement of said movable member into said base member;
    (4) a lateral extension on said foot member extending therefrom parallel to the lateral projection on said movable member and cooperating therewith to provide a pair of clamping jaws adapted to engage opposite edges of a panel resting against one surface of said bar-like member;
    (5) spring means between said base member and said movable member for urging said clamping jaws into clamping engagement with opposite edges of a panel disposed against said one surface of said bar-like member;
    (6) handle means including a cross palm hand grips on said base member, adjacent the upper end of said base member, and extending laterally from that surface thereof opposite said one panel engaging surface from which said clamping jaws extend;
    (7) an upturned lip on the lateral projecting jaw of said base member for maintaining a panel clampingly engaged by said clamping jaws adjacent the bar-like member during use thereof; and
    (8) said base member of said bar-like member being of a length slightly greater than one half the width of a standard size of sheet material to be carried thereby for locating said cross palm grip handle on the opposite side of the carrier.

2. The panel carrier in accordance with that of claim 1 in which said handle means includes a knob adjacent the foot portion on said base member and cooperating with said cross palm grip adjacent the open upper end thereof for enabling a person gripping both of said handle means, one in each hand, to lift and move said carrier with panel therein into various places necessary for placement of such panel.

* * * * *